(12) United States Patent
Chen et al.

(10) Patent No.: US 8,537,315 B2
(45) Date of Patent: Sep. 17, 2013

(54) LIQUID CRYSTAL DISPLAY HAVING ALIGNMENT AREAS AND ELECTRODE AREAS WITH PARTICULAR BOUNDARIES AND OPENINGS

(75) Inventors: Jian-Cheng Chen, Chu-Nan (TW); Chih-Yung Hsieh, Chu-Nan (TW); Bo-Chin Tsuei, Chu-Nan (TW)

(73) Assignee: Chimei Innolux Corporation, Chu-Nan (TW)

( * ) Notice: Subject to any disclaimer, the term of this patent is extended or adjusted under 35 U.S.C. 154(b) by 215 days.

(21) Appl. No.: 13/084,799

(22) Filed: Apr. 12, 2011

(65) Prior Publication Data

US 2012/0057114 A1     Mar. 8, 2012

(30) Foreign Application Priority Data

Sep. 7, 2010   (TW) ............................... 99130244 A
Sep. 13, 2010  (CN) .......................... 2010 1 0279508

(51) Int. Cl.
*G02F 1/1337*   (2006.01)
*G02F 1/1343*   (2006.01)

(52) U.S. Cl.
USPC ............................. 349/129; 349/139; 349/144

(58) Field of Classification Search
USPC .......................................... 349/129, 139, 144
See application file for complete search history.

(56) References Cited

U.S. PATENT DOCUMENTS

| 2004/0046914 A1* | 3/2004 | Hirota ........................... 349/129 |
| 2007/0273818 A1* | 11/2007 | Yoshida et al. ................ 349/128 |
| 2009/0002588 A1* | 1/2009 | Lee et al. ......................... 349/42 |

* cited by examiner

*Primary Examiner* — Michael Caley
(74) *Attorney, Agent, or Firm* — Liu & Liu

(57) ABSTRACT

A liquid crystal display (LCD) structure is provided. A first alignment layer and a first electrode layer are disposed on a liquid crystal layer. A second electrode layer and a second alignment layer disposed under the liquid crystal layer. The first alignment layer and the second alignment layer respectively have a plurality of alignment areas with different aligning directions. At least one of the first electrode layer and the second electrode layer includes a substrate material and a plurality of openings, and at least includes a plurality of electrode areas. The boundaries of the electrode areas correspond to the boundaries of the alignment areas. The directions of the openings in the electrode areas are between the aligning directions of the corresponding alignment areas of the first alignment layer and the second alignment layer.

8 Claims, 5 Drawing Sheets

LIQUID CRYSTAL DISPLAY HAVING ALIGNMENT AREAS AND ELECTRODE AREAS WITH PARTICULAR BOUNDARIES AND OPENINGS

This application claims the benefit of Taiwan application Serial No. 99130244, filed Sep. 7, 2010, the subject matter of which is incorporated herein by reference.

BACKGROUND OF THE INVENTION

1. Field of the Invention

The invention relates in general to a liquid crystal display (LCD) structure, and more particularly to a LCD structure of a high optical transmittance.

2. Description of the Related Art

In the liquid crystal display technology, the liquid crystal molecules must be able to tile in different directions in domains for meeting the requirements of fast response and wide view-angle, and such process is called "multi-domain alignment".

FIG. 1 shows a cross-sectional view of a generally known LCD structure. A liquid crystal layer 5 is disposed between a thin-film transistor (TFT) substrate 6 and a color filter (CF) substrate 9. The TFT substrate 6 comprises a glass substrate 8, an electrode layer 2 and an alignment layer 3. The electrode layer 2 is disposed on the glass substrate 8, and the alignment layer 3 is disposed on the electrode layer 2. The CF substrate 9 comprises a glass substrate 7, an electrode layer 2 and an alignment layer 4. The electrode layer 1 is disposed on the glass substrate 7, and the alignment layer 4 is disposed on the electrode layer 1.

FIGS. 2 and 3 respectively show the aligning directions of the alignment layers 3 and 4. FIG. 4 shows tilt directions of the liquid crystal molecules of the liquid crystal layer 5. As indicated in FIGS. 2 and 3, the alignment layer 3 has two alignment areas whose vertical aligning directions differ by 180 degrees, and the alignment layer 4 has two alignment areas whose horizontal aligning directions differ by 180 degrees. Thus, the liquid crystal molecules of the liquid crystal layer 5 can be aligned in four areas (the solid arrows in FIG. 5 indicate that there are other liquid crystal molecules whose tilt directions are between the aligning directions of the alignment layers 3 and 4). That is, four liquid crystal tilt areas are created.

FIG. 5 shows a top view of the electrode layers 1 and 2. As indicated in FIG. 5, in the generally known technology, the alignment layers 3 and 4 incorporated with electrode layers 1 and 2 which are without any opening may be used.

However, during operating by applying a voltage to the LCD structure having the electrode layers 1 and 2 and the alignment layers 3 and 4, the alignment of the alignment layers 3 and 4 would generate cross-shaped shadow textures in the boundaries of the alignment areas. Besides, due to the fringe field effect from the electrode layers 1 and 2, a shadow texture also occurs to the side of each of the alignment area as indicated in FIG. 6. Consequently, the LCD structure has a low optical transmittance such as about 27.48%.

SUMMARY OF THE INVENTION

The invention is directed to a liquid crystal display (LCD) structure which has less shadow textures and higher optical transmittance than the generally known liquid crystal display structure.

A LCD structure is provided. The LCD structure comprises a liquid crystal layer, a first alignment layer, a first electrode layer, a second alignment layer and a second electrode layer. The first alignment layer is disposed on the liquid crystal layer and at least comprises a first alignment area and a second alignment area. The first alignment area has a first aligning direction. The second alignment area has a second aligning direction. The first electrode layer is disposed on the liquid crystal layer. The second alignment layer is disposed under the liquid crystal layer. The second alignment layer at least comprises a third alignment area and a fourth alignment area. The third alignment area has a third aligning direction. The fourth alignment area has a fourth aligning direction. The first aligning direction, the second aligning direction, the third aligning direction and the fourth aligning direction are different. The second electrode layer is disposed under the liquid crystal layer. At least one of the first electrode layer and the second electrode layer comprises a substrate material and a plurality of openings, and at least comprises a first electrode area, a second electrode area, a third electrode area and a fourth electrode area. Boundaries of the first electrode area, the second electrode area, the third electrode area and the fourth electrode area correspond to a boundary of the first alignment area and the second alignment area, and correspond to a boundary of the third alignment area and the fourth alignment area. The openings are disposed in the first electrode area, the second electrode area, the third electrode area and the fourth electrode area or their boundaries. The directions of the openings in the first electrode area are between the first aligning direction and the third aligning direction. The directions of the openings in the second electrode area are between the second aligning direction and the third aligning direction. The directions of the openings in the third electrode areas are between the first aligning direction and the fourth aligning direction. The directions of the openings in the fourth electrode area are between the second aligning direction and the fourth aligning direction.

A LCD structure is provided. The LCD structure comprises a liquid crystal layer, a first alignment layer, a first electrode layer, a second alignment layer and a second electrode layer. The first alignment layer is disposed on the liquid crystal layer. The first alignment layer at least comprises a first alignment area and a second alignment area. The first alignment area has a first aligning direction. The second alignment area has a second aligning direction. The first electrode layer is disposed on the liquid crystal layer. The second alignment layer disposed under the liquid crystal layer. The second alignment layer at least comprises a third alignment area and a fourth alignment area. The third alignment area has a third aligning direction. The fourth alignment area has a fourth aligning direction. The first aligning direction, the second aligning direction, the third aligning direction and the fourth aligning direction are different. The second electrode layer is disposed under the liquid crystal layer. At least one of the first electrode layer and the second electrode layer comprises a substrate material and a plurality of openings, and at least comprises a first electrode area, a second electrode area, a third electrode area and a fourth electrode area. Boundaries of the first electrode area, the second electrode area, the third electrode area and the fourth electrode area correspond to a boundary of the first alignment area and the second alignment area, and correspond to a boundary of the third alignment area and the fourth alignment area. The openings are disposed in the boundaries of the first electrode area, the second electrode area, the third electrode area and the fourth electrode area, wherein the openings are arranged in a cross shape.

A LCD structure is provided. The LCD structure comprises a liquid crystal layer, a first alignment layer, a first electrode layer, a second alignment layer and a second electrode layer.

The first alignment layer and the first electrode layer are disposed on the liquid crystal layer. The first alignment layer at least comprises a first alignment area and a second alignment area respectively having a first aligning direction and a second aligning direction. The second electrode layer and the second alignment layer are disposed under the liquid crystal layer. The second alignment layer at least comprises a third alignment area and a fourth alignment area respectively having a third aligning direction and a fourth aligning direction. The first aligning direction, the second aligning direction, the third aligning direction and the fourth aligning direction are different. At least one of the first electrode layer and the second electrode layer comprises a substrate material and a plurality of openings, and at least comprises a first electrode area, a second electrode area, a third electrode area and a fourth electrode area. Boundaries of the first electrode area, the second electrode area, the third electrode area and the fourth electrode area correspond to a boundary of the first alignment area and the second alignment area, and correspond to a boundary of the third alignment area and the fourth alignment area. The directions of the openings in the first electrode area are between the first aligning direction and the third aligning direction. The directions of the openings in the second electrode area are between the second aligning direction and the third aligning direction. The directions of the openings in the third electrode area are between the first aligning direction and the fourth aligning direction. The directions of the openings in the fourth electrode area are between the second aligning direction and the fourth aligning direction.

The above and other aspects of the invention will become better understood with regard to the following detailed description of the preferred but non-limiting embodiment(s). The following description is made with reference to the accompanying drawings.

DETAILED DESCRIPTION OF THE INVENTION

The embodiments based on the concepts of the disclosure are described with the accompanying drawings FIG. 2~FIG. 4 and FIGS. 7~13. However, the disclosure is not limited thereto.

Figure 7:
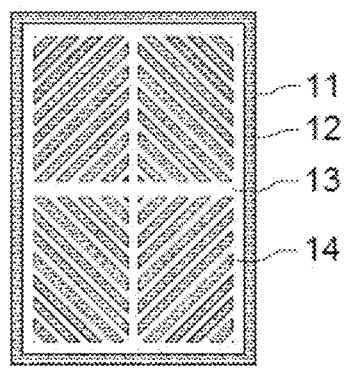
FIG. 7 shows a top view of electrode layers of a TFT substrate and a color filter substrate of the first embodiment of the present disclosure.

FIG. 7 shows a top view of electrode layers of a thin-film transistor (TFT) substrate and a color filter (CF) substrate of the first embodiment of the disclosure. As indicated in FIG. 7, the electrode layer 12 of the TFT substrate comprises a substrate material 13 and a plurality of openings 14 disposed therein. The electrode layer 11 of the CF substrate does not have any opening. Thus, the electrode layer 11 disposed under the electrode layer 12 can be viewed through the openings 14 in FIG. 7.

Figure 1:
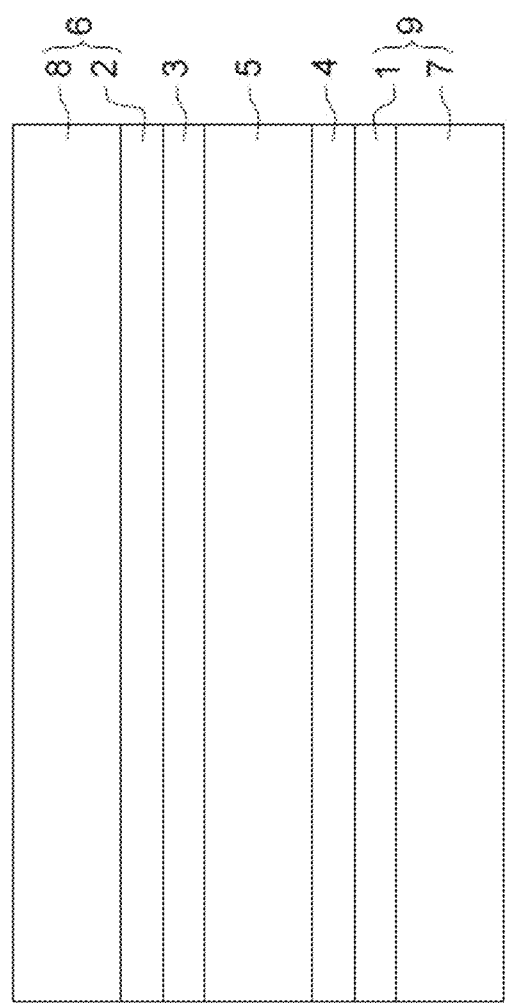
FIG. 1 shows a cross-sectional view of a generally known LCD structure.
Figure 2:
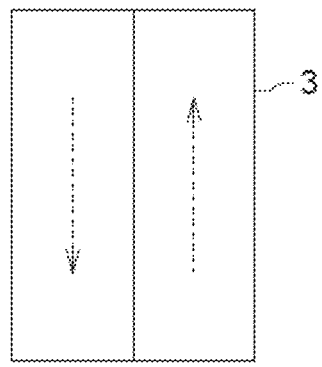
FIG. 2 shows aligning directions of alignment layers.
Figure 3:
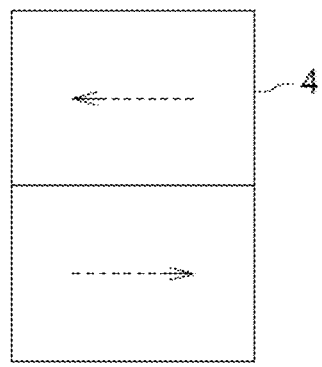
FIG. 3 shows aligning directions of alignment layers.
Figure 4:
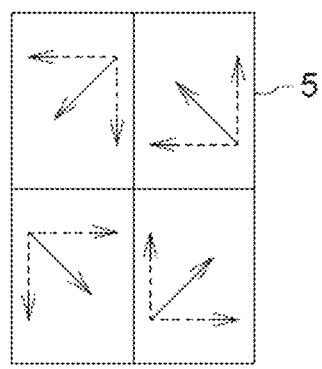
FIG. 4 shows tilt directions of liquid crystal molecules of a liquid crystal layer.

As indicated in FIG. 7, the electrode layer 12 comprises a plurality of (for example, top left, bottom left, top right, and bottom right) electrode areas respectively corresponding to a plurality of (for example, top left, bottom left, top right, and bottom right) liquid crystal tilt areas in the liquid crystal layer 5 formed due to the alignment layers 3 and 4. The boundaries of the electrode areas of the electrode layer 12 may correspond to the boundaries (FIG. 4) of different alignment areas of the alignment layers 3 and 4 (FIGS. 2 and 3). In an embodiment, the electrode areas of the electrode layer 12 is defined by the cross-shaped portion in the middle of the substrate material 13 as indicated in FIG. 7. The cross-shaped portion may correspond to the (cross-shaped) boundaries (FIG. 4) of different alignment areas of the alignment layers 3 and 4 (FIGS. 2 and 3).

Figure 6:
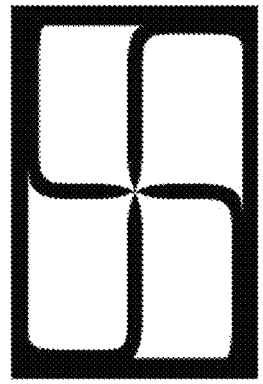
FIG. 6 a bright state optical texture of a generally known LCD structure.
Figure 8:
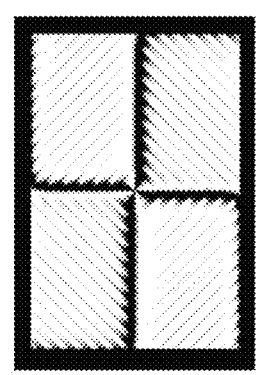
FIG. 8 shows a bright state optical texture of a LCD structure of an embodiment.

Referring to FIG. 7, in embodiments, the directions of the openings 14 in each electrode area of the electrode layer 12 are between the aligning directions of the corresponding alignment areas of the alignment layers 3 and 4 (not including the aligning directions). In addition, the openings 14 in the same electrode area can be parallel to each other. In an exemplary embodiment, the angle contained between the opening 14 and the boundary between the electrode areas (or between the openings 14 and the cross-shaped portion of the substrate material 13) is about 45 degrees. In an embodiment, the opening 14 in each electrode area of the electrode layer 12 are symmetrically arranged with respect to an intersection center point of the boundaries of the electrode areas. In an exemplary embodiment, the openings 14 in each electrode area of the electrode layer 12 are symmetrically arranged with respect to the boundaries of the cross-shaped portion as indicated in FIG. 7. FIG. 8 shows a bright state optical texture of the LCD structure of an embodiment, and the optical transmittance of which is about 28.02%, superior to that of the generally known LCD structure illustrated in FIG. 6.

Figure 9:
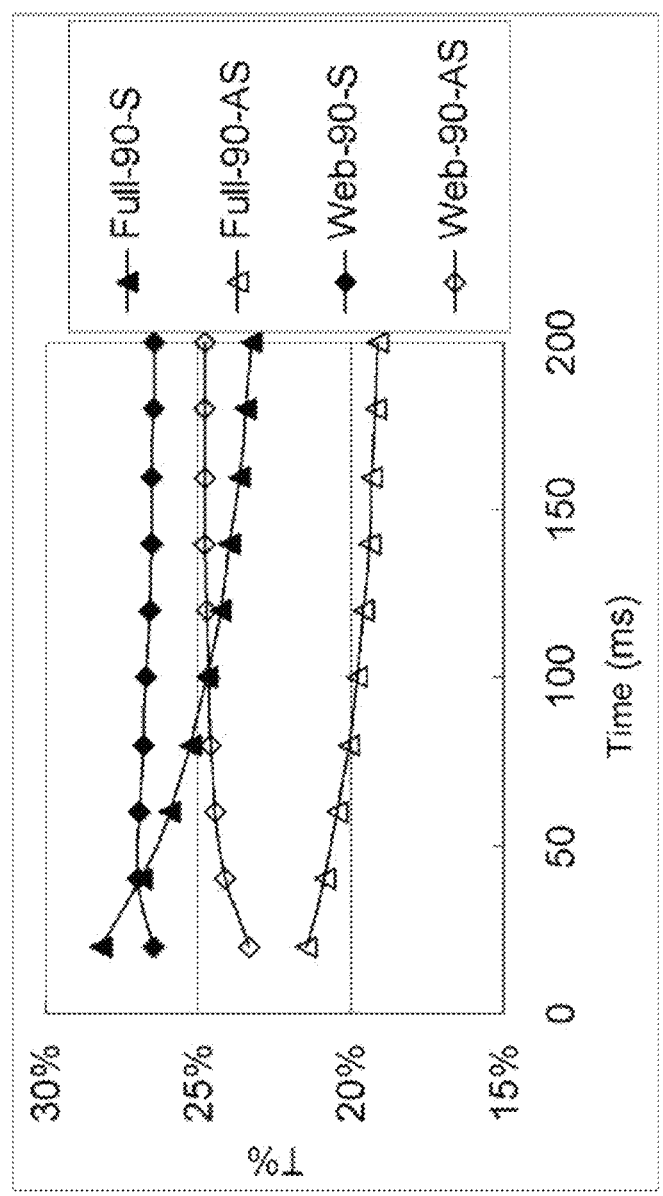
FIG. 9 shows a comparison of optical transmittance-time relationship between LCD structures of an embodiment of the disclosure and a generally known LCD structure having received a voltage.

FIG. 9 shows a comparison of optical transmittance-time relationship between the LCD structure of an embodiment of the disclosure and the generally known LCD structure having received a voltage. From the result shown in FIG. 9, it is found that, in the condition of the pixel size of 90 μm and the symmetric (S) or asymmetric (AS) liquid crystal pre-tilt angle, the optical transmittance of the LCD structure (Web) of the embodiment of the disclosure is higher than that of the generally known LCD structure (Full).

Figure 10:
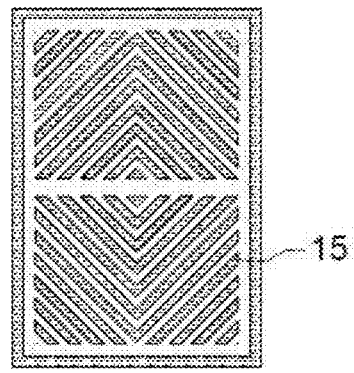
FIG. 10 shows a top view of electrode layers of a TFT substrate and a color filter substrate of the second embodiment of the present disclosure.
Figure 11:
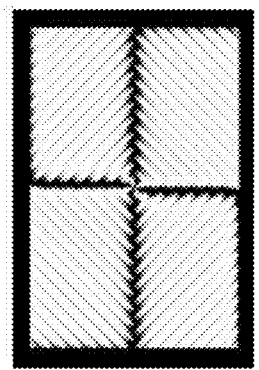
FIG. 11 shows a bright state optical texture of a LCD structure of an embodiment.

FIG. 10 shows a top view of the electrode layers of the TFT substrate and the CF substrate of the second embodiment of the disclosure. The LCD structure of FIG. 10 is different from the LCD structure of FIG. 7 in that the openings 15 in adjacent electrode areas can be interconnected. FIG. 11 shows a bright state optical texture of the LCD structure of an embodiment, for which the optical transmittance is about 28.11%, superior to that of the generally known LCD structure of FIG. 6.

Figure 12:
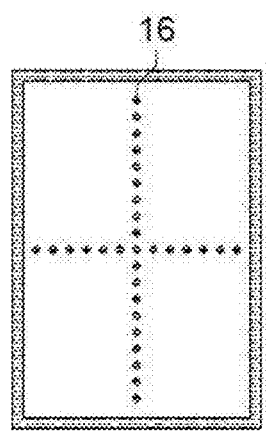
FIG. 12 shows a top view of electrode layers of a TFT substrate and a color filter substrate of the third embodiment of the present disclosure.
Figure 13:
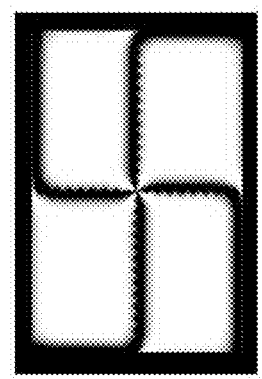
FIG. 13 shows a bright state optical texture of a LCD structure of an embodiment.

FIG. 12 shows a top view of the electrode layers of the TFT substrate and the CF substrate of the third embodiment. As indicated in FIG. 12, the openings 16 are disposed in the boundaries between the electrode areas. FIG. 13 shows a bright state optical texture of the LCD structure of an embodiment, for which the optical transmittance is about 27.74%, superior to that of the generally known LCD structure of FIG. 6.

Figure 5:
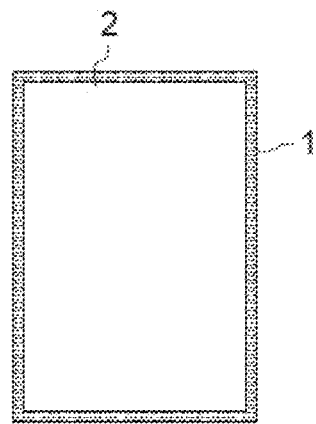
FIG. 5 shows a top view of electrode layers of a generally known TFT substrate and a color filter substrate.

In embodiments of the present disclosure, the electrode layer has a plurality of openings disposed in the electrode areas or the boundaries thereof, and the opening directions are between the aligning directions of the corresponding alignment areas of the alignment layers. In comparison to the generally known technology illustrated in FIG. 5, the LCD structure of the embodiments of the disclosure generates less shadow textures and achieves higher optical transmittance.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures. For example, it can be designed in the manner that the electrode layer of the CF substrate comprises a plurality of openings and the electrode layer of the TFT substrate does not have any opening, or, the electrode layers of the CF substrate and TFT substrate both comprise openings.

What is claimed is:

1. A LCD structure, comprising:
   a liquid crystal layer;
   a first alignment layer disposed on the liquid crystal layer, wherein the first alignment layer at least comprises:
   a first alignment area having a first aligning direction from a top side to a bottom side; and
   a second alignment area having a second aligning direction from the bottom side to the top side;
   a first electrode layer disposed on the liquid crystal layer;
   a second alignment layer disposed under the liquid crystal layer, wherein the second alignment layer at least comprises:
   a third alignment area having a third aligning direction from a right side to a left side; and
   a fourth alignment area having a fourth aligning direction from the left side to the right side, wherein the first aligning direction, the second aligning direction, the third aligning direction and the fourth aligning direction are different; and
   a second electrode layer disposed under the liquid crystal layer, wherein at least one of the first electrode layer and the second electrode layer comprises a substrate material and a plurality of openings, and at least comprises:
   a first electrode area;
   a second electrode area;
   a third electrode area; and
   a fourth electrode area,
   wherein:
   the first electrode area is adjacent between the second electrode area and the third electrode area, the fourth electrode area is adjacent between the second electrode area and the third electrode area,
   boundaries of the first electrode area, the second electrode area, the third electrode area and the fourth the electrode area correspond to a longitudinal boundary of the first alignment area and the second alignment area, and correspond to a horizontal boundary of the third alignment area and the fourth alignment area, the first aligning direction and the second aligning direction are parallel to the longitudinal boundary, the third aligning direction and the fourth aligning direction are parallel to the horizontal boundary,
   extending directions of the openings in the first electrode area are between the first aligning direction and the third aligning direction,
   extending directions of the openings in the second electrode area are between the second aligning direction and the third aligning direction,
   extending directions of the openings in the third electrode area are between the first aligning direction and the fourth aligning direction,
   extending directions of the openings in the fourth electrode area are between the second aligning direction and the fourth aligning direction,
   all intersection points between the extending directions of the openings in the first electrode area and the second electrode area, between the extending directions of the openings in the first electrode area and the third electrode area, between the extending directions of the openings in the fourth electrode area and the second electrode area, between the extending directions of the openings in the fourth electrode area and the third electrode area are away from an intersection point between the longitudinal boundary of the first alignment area and the second alignment area and the horizontal boundary of the third alignment area and the fourth alignment area.

2. The LCD structure according to claim 1, wherein the openings the first electrode area, the second electrode area, the third electrode area and the fourth electrode area are parallel to each other.

3. The LCD structure according to claim 1, wherein the first electrode area, the second electrode area, the third electrode area and the fourth electrode area are separated by a cross-shaped portion of the substrate material.

4. The LCD structure according to claim 3, wherein the angle contained between the openings and the cross-shaped portion is 45 degrees.

5. The LCD structure according to claim 1, wherein the angle contained between the openings and the boundaries of the first electrode area, the second electrode area, the third electrode area and the fourth electrode area is 45 degrees.

6. The LCD structure according to claim 1, wherein the openings are symmetrically arranged with respect to an intersection center point of the boundaries of the first electrode area, the second electrode area, the third electrode area and the fourth electrode area.

7. The LCD structure according to claim 1, wherein the openings in different electrode areas are separated from each other.

8. The LCD structure according to claim 1, wherein the openings in at least two of the first electrode area, the second electrode area, the third electrode area and the fourth electrode area are interconnected.

* * * * *